United States Patent [19]

Herzer et al.

[11] 3,982,491

[45] Sept. 28, 1976

[54] AUTOMATIC SEWING MACHINE

[75] Inventors: William P. Herzer, Northborough; Robert E. Cullen, Norwood, both of Mass.

[73] Assignee: Union Special Corporation, Chicago, Ill.

[22] Filed: Aug. 12, 1974

[21] Appl. No.: 496,748

[52] U.S. Cl. .......................................... 112/121.12

[51] Int. Cl.² .......................................... D05B 21/00

[58] Field of Search .................. 112/121.11, 121.12, 112/121.15, 158 E, 219 R, 219 A; 235/151.11; 318/567, 569

[56] References Cited

UNITED STATES PATENTS

| | | | |
|---|---|---|---|
| 2,837,046 | 6/1958 | Carson et al. | 112/121.12 |
| 3,385,245 | 5/1968 | Ramsey et al. | 112/121.12 |
| 3,465,298 | 9/1969 | Duke et al. | 235/151.11 X |
| 3,654,882 | 4/1972 | Kamena | 112/121.11 |
| 3,742,878 | 7/1973 | Byrne et al. | 112/121.12 |
| 3,742,879 | 7/1973 | Schaefer et al. | 112/121.12 |
| 3,752,098 | 8/1973 | Logan et al. | 112/121.12 |
| 3,771,477 | 11/1973 | Conner, Jr. | 112/121.12 |
| 3,783,811 | 1/1974 | Schmedding et al. | 112/219 R |
| 3,818,849 | 6/1974 | Maddox, Jr. | 112/219 A |
| 3,830,175 | 8/1974 | Levor | 112/121.12 |
| 3,855,956 | 12/1974 | Wurst | 112/158 E |

*Primary Examiner*—Werner H. Schroeder
*Assistant Examiner*—Peter Nerbun

[57] ABSTRACT

The disclosed invention describes an automatic sewing machine which uses a randomly addressable storage element to store a sequence of instructions. The instructions describe a pattern through which a work holder securing a work piece is moved. Electrical circuitry reads the instructions stored in the storage element in a predetermined sequence and provides electrical signals dependent upon the sequence of instructions. A pair of stepping motors respond to the electrical signals to move the work holder. The electrical signals to the stepping motors are aperiodic in order to increase the machine cycle rate and to reduce the tendency of the stepping motors to oscillate. A closed loop actuatable homing device moves the work holder to a predetermined "home" position prior to reading any of the sequence of instructions. Thereafter the work holder is moved according to the sequence of instructions in an open loop mode. Limit circuitry prevents the work holder from being moved beyond predetermined limits. At the end of each sequence of instructions the homing device returns the work holder to its predetermined home position.

71 Claims, 13 Drawing Figures

FIG.3.
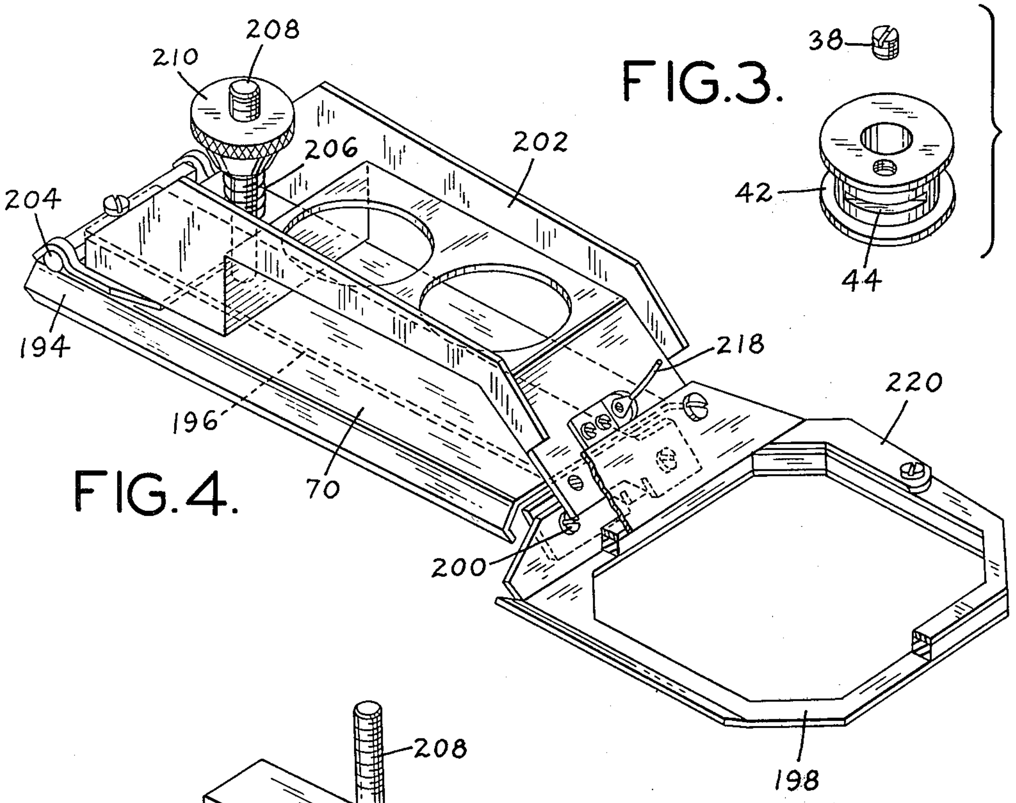
FIG.4.
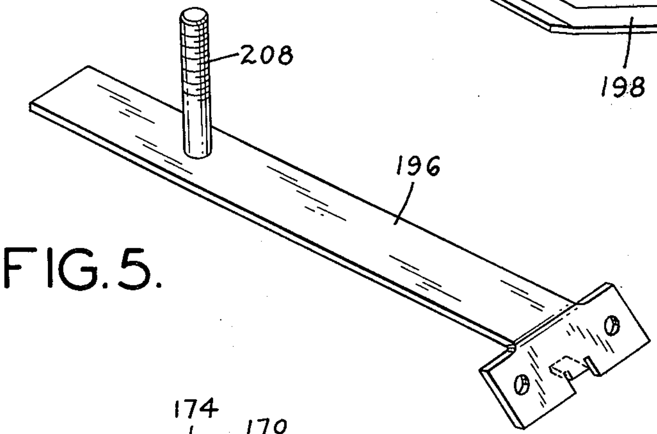
FIG.5.
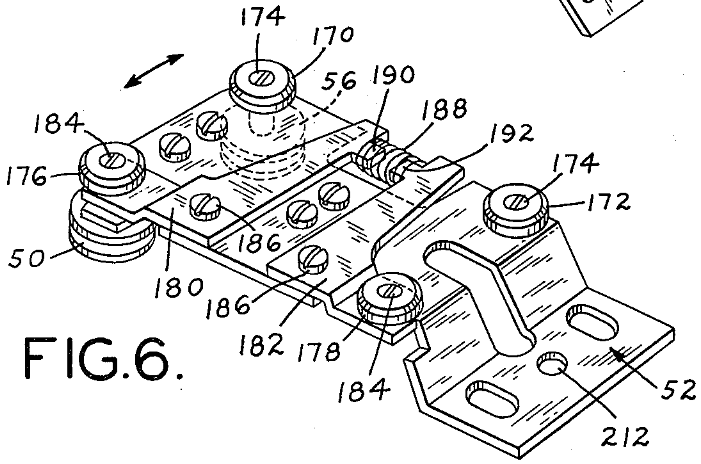
FIG.6.

AUTOMATIC SEWING MACHINE

BACKGROUND OF THE INVENTION

This invention relates to sewing machines and more particularly to program controlled automatic sewing machines.

Sewing machines with a work element or holder for moving a work piece through a predetermined pattern relative to the machine's sewing needle are known. They are particularly useful when the same pattern is stitched repetitively. Zigzag, monogram, bar tack and button hole stitching are familiar examples. The earliest of these automatic sewing machines were complex cam controlled devices in which the entire cam apparatus has to be replaced and time consuming adjustments made whenever it is desired to change a machine from sewing one pattern to another. Even so, certain cam controlled machines, such as those for sewing button holes and tacking, have no capability at all for conversion to other stitch patterns.

More recently, automatic sewing machines have become available in which the work holder is moved according to a sequence of instructions stored in a mechanically controlled element such as a punched paper tape, cards, or a magnetic tape. In such machines the sequence of instructions in the recording medium controls the movement of the work holder during the portion of each needle cycle when the needle is out of the work.

Automatic sewing machines with work holders using paper or magnetic tape or cards to control their movement, however, suffer several disadvantages. First, the tape and card machines move relatively slowly from one location of stored information to the next location. Accordingly, for the machine to work fast enough, a complete instruction must be placed in a single storage location. Further, the complexity of the operation of the sewing machine is limited by the amount of information which can be placed in each such location. A second limitation, mechanical in nature, exists because of the speed of the sewing machine is limited by the speed at which the storage medium can be physically moved from one storage location to the next. Third, a paper or magnetic tape or card reader is relatively costly in comparison to cam controlled machines. Further, though buffer units to enable faster operation are available, they considerably increase the expense of the system.

It is therefore one object of this invention to provide an improved automatic sewing machine in which the speed of movement of the work holder is not limited by mechanical limitations in the instruction storage medium. Other objects include providing an apparatus which controls the movement of the work holder more accurately and with more flexibility than heretofore and which is relatively inexpensive yet reliable. It is also an object to provide an automatic sewing machine which is capable of producing virtually any sewing pattern within the clamp boundaries with stitches of variable length and at needle speeds determined primarily by the maximum stitch size to be sewn. Further, other and additional objects and advantages of the invention will become apparent from the description which follows, the drawings and the appended claims.

Summary of the Invention

The invention comprises an automatic sewing machine having a sewing needle, a work holder for holding a work piece during sewing, a storage element having a plurality of randomly addressable storage locations, the storage locations containing instructions for positioning the work holder and needle relative to one another in a plurality of positions to produce a predetermined pattern of movement and stitching, and electrical means for addressing the storage locations in the storage element in a predetermined sequence and for reading the instructions thereby made available in sequence. The electrical means provides sequential output signals representative of the read instructions, and means are also provided which are responsive to such sequential output signals for intermittently positioning the work holder relative to the needle whenever the needle is out of contact with the work piece to produce the predetermined pattern of movement and stitching without damaging the needle.

In the preferred embodiment the storage element is a semiconductor programmable read only memory in which a complete instruction is stored in more than one addressable storage location. However, the storage element may also comprise a read only memory in which the storage instructions may not be changed to describe a new pattern of movement.

One feature of the invention concerns the use of a randomly addressable storage element as part of the apparatus. The random address capability of such an element enables the apparatus to read stored instructions from one storage location after another in any order without the delays inherent in mechanically controlled storage elements which have to be physically moved from one position to another in order for more than one storage location to be addressed at a given time.

The electrical circuitry in addition to reading instructions from the storage element features circuitry adapted to convert the instructions to a series of electrical pulses for stepping a pair of stepping motors. The circuitry steps these motors at an aperiodic rate in order to increase the needle cycle rate and to eliminate the oscillatory tendency of the motors.

The sewing machine according to the invention operates in an open loop type of control in which the stored instructions determine the sequence of movements required, but in which there is no feedback apparatus to indicate whether or not the movable elements of the device reach the locations specified by the instructions. One advantage of this type of system is that it is considerably less expensive to manufacture than closed loop systems for accomplishing the same function.

In order to begin an instruction reading sequence at a predetermined reference or home position, the invention further features an actuatable closed loop homing means. The homing means includes a position indicating device for reporting the position of the work holder relative to the predetermined home position. The homing means further includes circuitry responsive to the position indicating device for automatically positioning the work holder at the home position. In the preferred embodiment, additional circuitry is included to insure that the final movement of the work holder into its home position always takes place in the same direction. This capability allows each sewing operation to begin from a known predetermined location.

It may happen through an error that the work holder is commanded to move into the path of the sewing needle thereby damaging the needle. In order to prevent this from happening, the invention further features limiting circuitry responsive to the position of the work holder for halting the movement of the work holder beyond a predetermined range of movement by inhibiting the passage of signals to the stepping motors. Other operations of the electrical circuitry proceed in a normal fashion.

The use of a random access memory also provides great flexibility in the ability of the apparatus to respond to the existence of improper operating conditions. Another aspect of the invention therefore features circuitry for halting both the sequential reading of instructions and the movement of the sewing needle in response to an interrupt signal from a check device indicating the existence of an improper operating condition. An example of such an improper operating condition is a break in the sewing thread. After the improper operating condition has been corrected, a restart switch is provided for beginning again the sequential reading of instructions. At the option of the operator, the restart switch enables the instructions to be read beginning at either the instruction after the occurrence of the improper operating condition or the beginning of the sewing pattern.

BRIEF DESCRIPTION OF THE DRAWINGS

Other features, objects, and advantages of the invention will be described below in connection with the following drawings in which:

FIG. 3 shows one of the novel stepping motor pulleys:

FIG. 4 is a pictorial drawing of the extendable portion of the arm and work holder assembly;

FIG. 5 shows the extendable arm bracket for the lower clamp;

FIG. 6 is a perspective view of the pivoting arm portion of the work holder assembly;

DESCRIPTION OF A PARTICULAR EMBODIMENT

Figure 1:
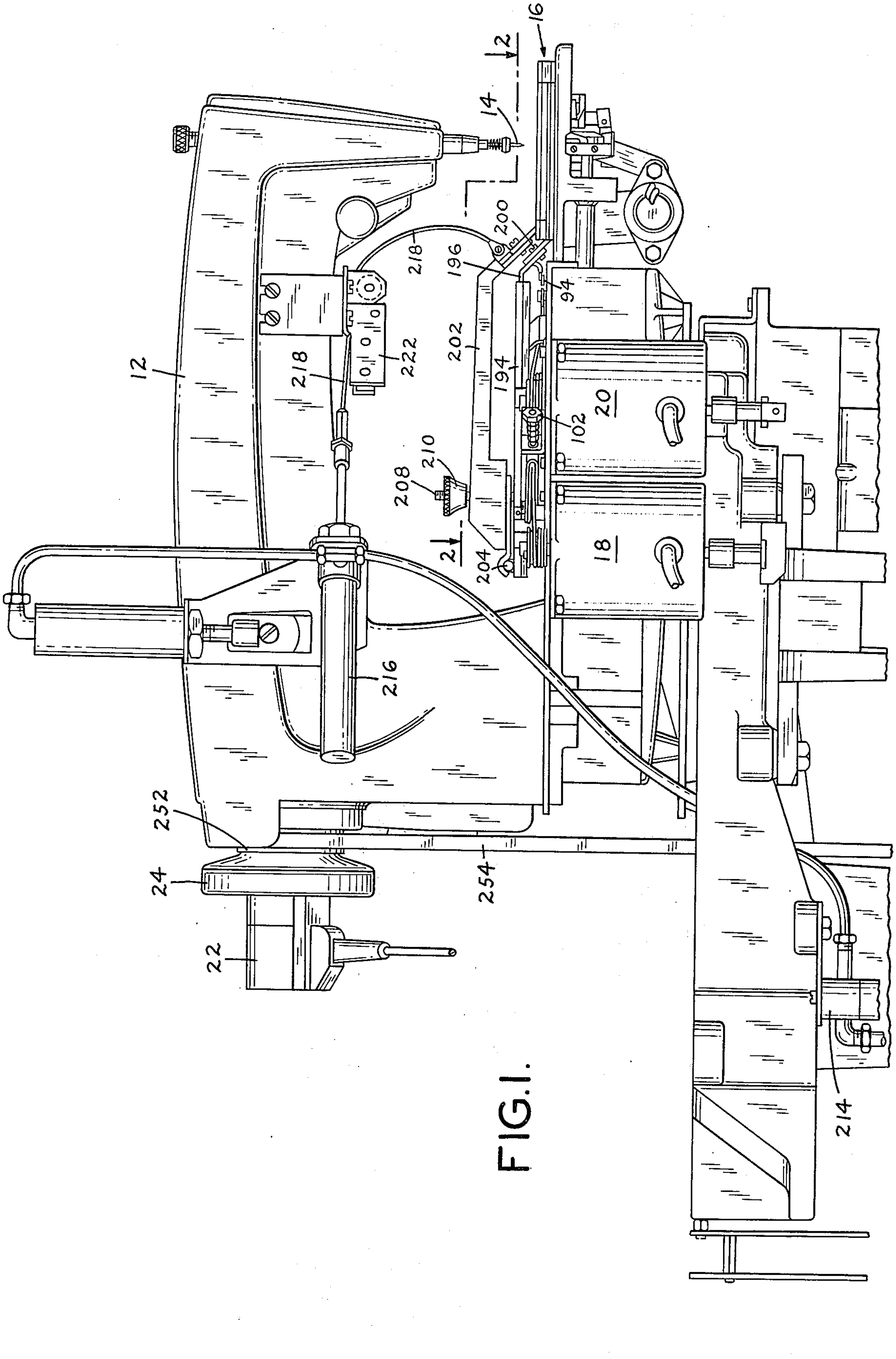
FIG. 1 is a side elevation view of portions of a sewing machine incorporating the invention.

Referring to FIG. 1, the mechanical portion of a program controlled sewing machine according to the invention includes an overhanging arm 12 which carries mechanical power to a sewing needle 14. The work piece to be sewn (not shown) is held generally in a work holder 16 which is moved in a horizontal plane by a novel power translation system. This system is driven by a pair of stepping motors 18, 20 which supply driving power to move the work holder in two coordinate directions. The power translation system acts to translate the rotary drive of the stepping motors to movement of the work holder in its two coordinate directions.

The stepping motors are driven by electrical signals from novel electrical circuitry. These signals are synchronized to the movement of the needle 14 into and out of the work piece by a novel electromechanical synchronization unit 22. Unit 22 is connected to and driven by a conventional hand wheel 24 of the sewing machine and supplies synchronization signals to the electrical circuitry.

In this particular embodiment, the work holder is moved in a predetermined pattern relative to the movement of the sewing machine needle. A sequence of instructions describing the desired pattern of movement and stitching of the work holder 16 is stored in a storage element having a plurality of randomly addressable storage locations. Preferably, the storage element is a programmable read only memory. In such devices the instructions stored in the various storage locations may be changed to describe a desired new pattern of movement. The storage element may also be, for example, a randon.ly addressable read only memory in which the stored instructions may not be changed to describe a new pattern of movement. Solid state memory elements of both types are available and are preferred. As known to the art, such memory or storage elements are nonvolatile, i.e., they retain data during power disruptions, and are nondestructive, i.e., data is not destroyed as a result of the reading operation ("Reference Data for Radio Engineers", Ch. 40, p. 18, Howard W. Sams & Co., Inc., Indianapolis, Indiana, 1975; G. Luecke, J. P. Mize, and W. N. Carr, "Semiconductor Memory Design and Application", pp. 15–18, McGraw-Hill Book Company, New York, 1973; and L. Nashelsky, "Introduction to Digital Computer Technology", p. 474, John Wiley & Sons, Inc., New York, 1972).

Electrical control circuitry is provided which reads information from as many of the addressable locations of the storage element as necessary to obtain a complete instruction for each movement of the work holder. It also converts each instruction into a sequence of pulses to be applied to the stepping motors, and thus drives the motors at a time when, as indicated by the synchronizing unit 22, the needle 14 is not engaged in the work piece. In this way, movement of the work holder is timed not to adversely affect the movement of the sewing needle 14.

Figure 2:
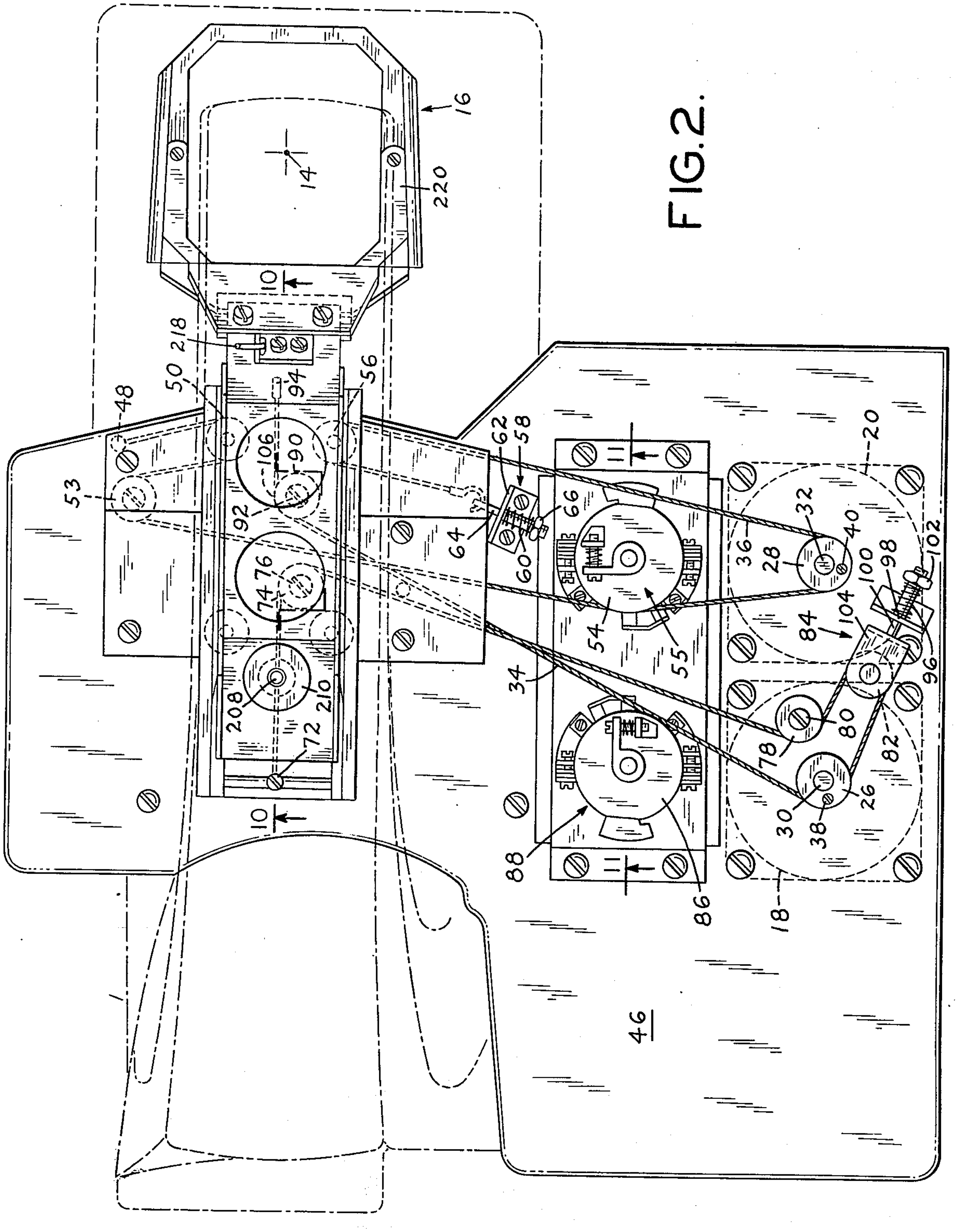
FIG. 2 is a sectional top view of a portion of the sewing machine taken along line 2—2 of FIG. 1 with certain parts removed.

Referring to FIG. 2, the power translating system used to transmit power from stepping motors 18, 20 to the work holder 16 comprises two cable systems, one for each coordinate direction. The cable systems are arranged as follows. Pulleys 26, 28 are attached to shafts 30, 32 of stepping motors 18, 20. Cables 34, 36 are secured around pulleys 26, 28 respectively by screws 38, 40 respectively. In this manner, the rotational movement of the stepping motor shafts 30, 32 is converted into linear movement of the cables 34, 36.

Referring now to FIG. 3, each of pulleys 26, 28 has a groove 42 in which a cutout 44 is formed. The cutout extends a distance circumferentially on the core 42 or groove of the pulley between its ends so that at least part of a turn of the cable is made above the cutout 44 and part of a turn of the cable is made below it. Between these turns, the cable drops into the cutout 44 where it is secured, for example, in pulley 26 by a screw 38. In this way, the appropriate cable is rigidly secured to each pulley.

At one end, cable 36, which pivots the work holder about the pivot pin 68 (see FIG. 10), is attached to a base plate 46 of the sewing machine by a hook and shoulder screw 48. The cable is then threaded around a free turning pulley 50 attached to the underside of a pivoting arm 52 (see also FIG. 6). The cable is then threaded around a free turning pulley 53 also attached to the base plate 46, from which the cable makes a complete turn around a large pulley 54 secured to a homing and limit assembly 55. The cable is then threaded around pulley 28 of stepping motor 20, as previously described, and then around a free turning pulley 56 attached to the underside of the pivoting arm 52. The end of the cable is then secured to a tension assembly 58 which includes a compression spring 60, one end of the spring bearing against a support 62 secured to the base 46 and the other end of the spring bearing against a draw bar assembly 64 to which the cable 36 is secured. The draw bar assembly has a nut 66 which together with the spring 60 regulates the tension on cable 36 to insure that no part of the cable becomes slack.

In operation, as stepping motor 20 rotates pulley 28 the cable 36 pulls one of the pulleys 50, 56, depending on the direction of cable movement away from a center line between the needle and the pivot pin 68 and thus rotates the arm 52 about the pin 68 to one side or the other of the work holder's center position shown in FIG. 2. Pivoting arm 52 carries with it, as it pivots, an extendable arm 70 (FIGS. 4 and 10), to one end of which is affixed the work holder 16. Thus, as arm 52 rotates about pivot pin 68, so do arm 70 and work holder 16.

Figure 10:
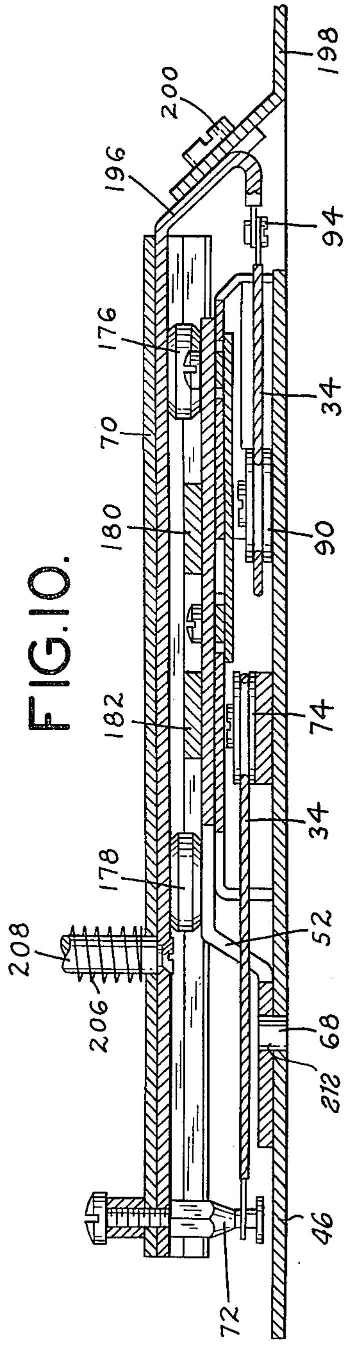
FIG. 10 is a cross sectional view of the extendable and pivoting arm assemblies taken along line 10—10 in FIG. 2.

Affixed to a post 72 at the opposite end of the arm 70 from the work holder is one end of the cable 34 which controls the radial movement of the arm 70 (see FIGS. 2 and 10). From there, the cable is threaded around a free turning pulley 74, attached to base plate 46 by means of a shoulder screw 76, and then around a free turning pulley 78 which is attached to the base plate 46 by means of a shoulder screw 80. The cable is next threaded around a free turning pulley 82 of a cable tensioning pulley assembly 84, also mounted on the plate 46, from which it is trained around pulley 26 for 2¼ turns. The cable is secured to the pulley 26 by a screw 38 as previously described. Cable 34 is then threaded completely around a large pulley 86 attached to a homing and limit assembly 88. From there, the cable then extends around a free turning pulley 90 attached to the base plate 46 by a shoulder screw 92. The cable terminates at the underside of the extendable arm 70 at a connecting point 94 mounted at a point on the underside of the arm 70 which lies on a line between the pivot pin 68 and the sewing needle 14 when the pivoting arm 52 is in its center position. Pulley 90 has a circumferential groove (not shown) for the cable 34.

Cable 34 is maintained under continuous tension by the cable tensioning pulley assembly 84. This assembly consists of a compression spring 96, a support 98, a draw bar 100, and a nut 102. Instead of the hook of assembly 58, the reaction force which tensions cable 34 is transmitted from the draw bar to the cable through a pulley block 104 and pulley 82. In this particular embodiment, pulley assembly 84 is advantageously placed, as shown, physically separated from arms 52, 70, first, because this arrangement decreases the weight of pivoting arm 52 and extendable arm 70, thereby reducing their inertia, and second because, as shown, assembly 84 is more accessible for maintenance and adjustment.

In operation, when stepping motor 18 turns, the rotational motion of the motor is translated into linear cable motion and this in turn moves the extendable arm 70 carrying the work holder 16 radially with respect to the pivot pin 68.

Though, at first glance, the coordinate system in which the work holder moves appears to be polar, that is, a coordinate system having a radial component delivered by moving the extendable arm 70 over the pivoting arm 52, and an angular component, delivered by rotating the pivoting arm 52 about pivot pin 68, there is built into the system means for causing the work holder to move in what closely approximates a rectangular coordinate system with respect to the needle 14.

This means includes apparatus whereby, when the work holder is rotated about pivot pin 68, the circular line of stitching which would normally result from such movement is modified to approximate a straight line of stitching such as would be created in a rectangular coordinate system. This approximation of a straight line of stitching is accomplished automatically by shortening the effective length of the extendable arm 70 by amounts dependent on the amount of rotational movement imparted to the work holder by the pivoting arm 52. The amount by which the effective length of the extendable arm is shortened for a particular angular position of arm 52 is determined by (1) the distance from the connecting point 94 to both the needle 14 and the pivot pin 68, (2) the distance from the axis about which pulley 90 rotates to the connecting point 94 and (3) the radius of the pulley 90 at the inside of the circumferential groove. Pulley 90 is spaced to one side of a line between the pivot pin 68 and needle 14, a distance equal to the radius of the pulley plus one-half the thickness of the cable.

With the structure shown in the drawings, connecting point 94, for a fixed position of stepping motor 18 traces a path called the involute of a circle (the circle being the inner circumference of pulley 90), and the result is to pull the connecting point 94 radially inward more and more as the angle through which the arm 52 is rotated increases from its center position. As already discussed, the amount of radially inward movement required is such as to have the needle sew along a path which approximates a straight line when only a rotational movement is imparted to the work holder by the cable 36.

This is accomplished in this particular embodiment by making the distance between the pivot pin 68 and a tangent point 106 between the cable 34 and the pulley 90, 3.470 inches, by making the distance between tangent point 106 and cable connection point 94, 1.623 inches, and by making the distance between the pivot pin 68 and the needle 9.000 inches. These dimensions can be scaled up or down in larger or smaller equipment as long as the relationship between them remains the same.

As pivoting arm 52 pivots about pin 68 from its center position, the cable 34 winds or unwinds about the pulley 90, for clockwise or counterclockwise rotation, respectively. As a result, for the same angular rotation of arm 52 from the center position, the compensatory effect will vary depending upon the direction of rotation from the center position. In order to maintain the compensation as symmetrical as possible, it is necessary to keep the radius of pulley 90 as small as possible, consistent with proper handling of the cable 34. Accordingly, in the preferred embodiment of the invention, the radius for this pulley is about 0.328 inches.

In this particular embodiment, there are two homing assemblies and two limit assemblies, one of each being combined to operate from the same rotating shaft. As heretofore referred to these are homing and limit assemblies 55 and 88. Both homing and limit assemblies 55, 88 perform the same two functions. One is to position the work clamp at a predetermined location (home) and the other is to provide an indication, in this particular embodiment a contact closure, that the work holder is being moved beyond the predetermined allowed limits. Both limit assemblies also provide firm physical resistance to movement beyond the predetermined allowed limits. The homing assembly is intended to prevent cumulative errors in reference position from occurring from cycle to cycle and to always maintain registration. An additional function of the homing assembly is to insure extremely accurate start or end point positioning to enable auxiliary devices, such as slitting knives to cut buttonholes, to be actuated and to perform repeatedly with a high degree of positional accuracy.

Figure 11:
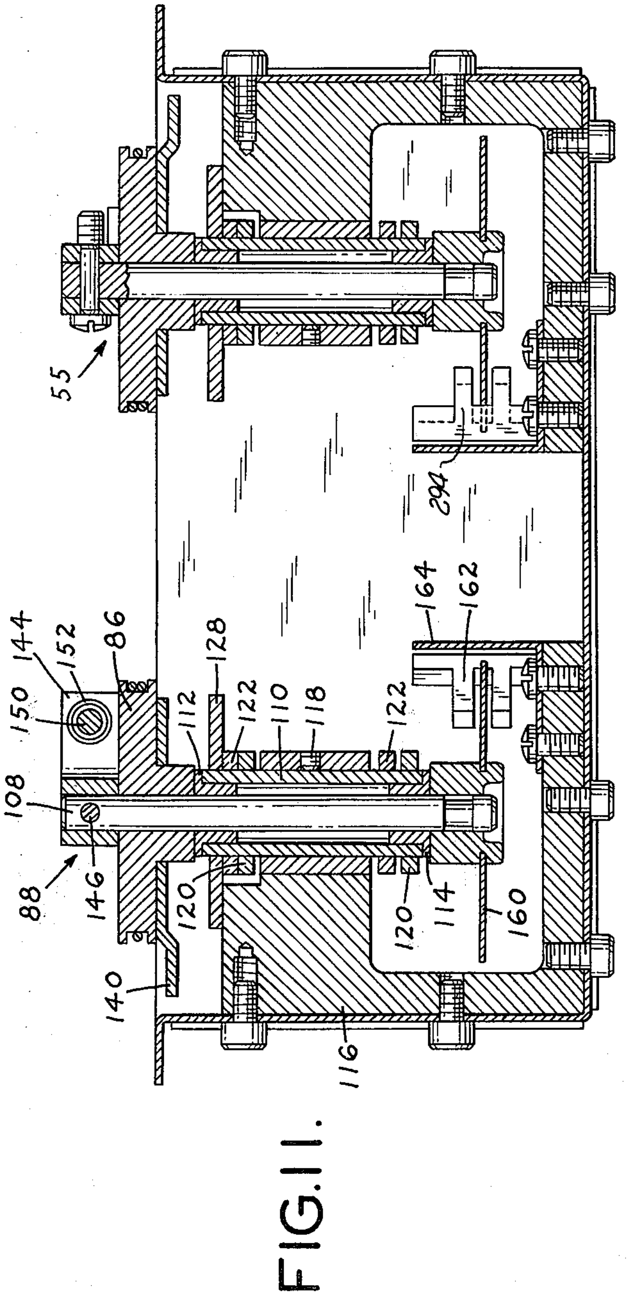
FIG. 11 is a cross sectional view taken along line 11—11 in FIG. 2 showing the homing and limit assembly.

Referring to FIG. 11, only homing and limit assembly 88 for limiting travel and effecting homing of arm 70 in the radial direction will be described in detail, assembly 55 having a similar operation and construction for the rotational coordinate direction. Pulley 86 of the homing and limit assembly 88 has a sufficiently large diameter that the maximum allowable cable travel for moving the work holder in a radial direction results in less than a complete revolution of the pulley. By thus limiting the angular rotation of a shaft 108 on which the pulley 86 is mounted to less than a full revolution, adjustable limit switches, secured in an operative relation to shaft 108, allow full range of radial movement of the work holder while providing a contact closure to electrical control circuitry to indicate that the work holder is being moved beyond the preset limits.

Figure 9:
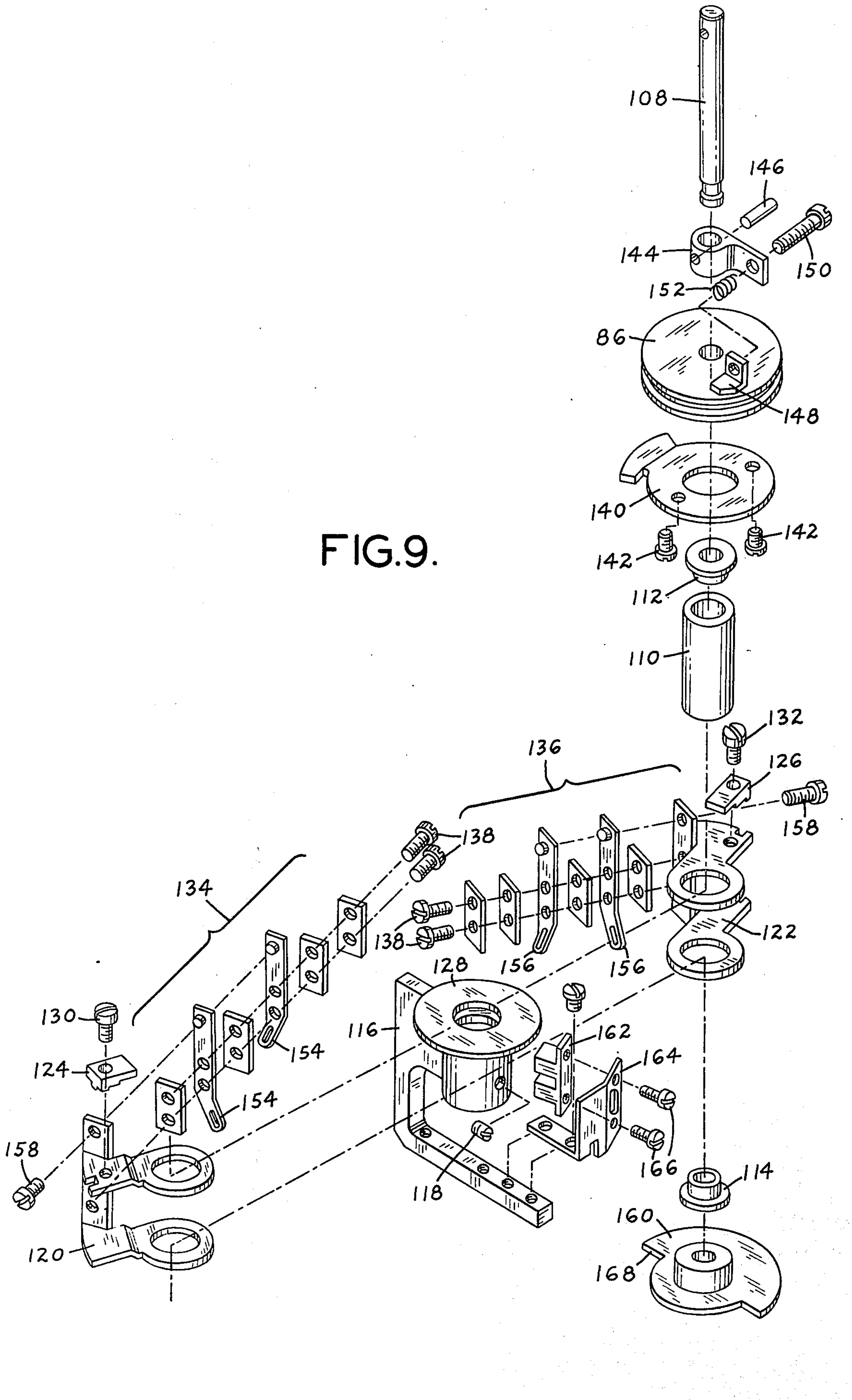
FIG. 9 is an exploded pictorial of the homing and limit assembly.

Referring to FIGS. 9 and 11, the limit assembly portion of homing and limit assembly 88 includes a sleeve 110, with bearings 112 and 114 pressed into its ends. The sleeve is held in a support assembly 116 by means of a screw 118. Limit switch brackets 120 and 122 fit around sleeve 110 and are held in position by clamps 124, 126 against a disc 128 of the support assembly 116 with screws 130, 132 respectively. Limit switch assemblies 134, 136 are hled on brackets 120, 122 respectively by means of screws 138. A trigger 140 for the homing and limit assembly, but used only for the limit function 88 is secured to the underside of pulley 86 by means of screws 142. Pulley 86 mates with and is rotatable on shaft 108 above disc 128 of the support assembly 116. Trigger 140 moves in an arc between limit switch assemblies 134 and 136 as pulley 86 rotates in response to movement of cable 34.

In normal operation, the work holder does not travel beyond the predetermined allowed limits because the instruction sequence controlling movement of the work holder does not instruct the drive circuitry to move the work holder that far. However, if for any reason the stepping motors continue to drive the work holder beyond the allowed range of movement and therefore into potential contact with the sewing machine needle, possibly damaging the needle or the work holder, trigger 140 engages the contacts 154 or 156 of limit switch assembly 134 or 136 causing them to close. Closure of normally open contacts 154 or 156 signals the electrical control circuitry to prevent further stepping of the corresponding stepping motor until the direction of travel for that motor is reversed.

As an extra safety, should the limit switches, the wiring to them, or the related electrical circuit fail so that the motor continues to be driven further out of the allowed limits, trigger 140 urges contacts 154, 156 against one of the backup screws 158 which have a fixed position with respect to support assembly 116. This prevents further movement of the trigger 140, and therefore of pulley 86, cable 34, and stepping motor 18. Further movement of the extendable arm 70 is thereby prevented and damage to the sewing needle 14 or the work holder is avoided. Backup screws 158 are preferably adjusted to stop contacts 154, 156 one motor step after the contacts have actuated. Similar apparatus is used for limiting travel of the work holder in the other coordinate direction.

The homing assembly portion of the homing and limit assembly 88 positions the work holder, upon command, to a predetermined location, the location being anywhere within the working range of the two-coordinate system. Because of the nature of the coordinate system in this embodiment, it is preferably to have the home position at the center of polar travel and near that limit of radial travel at which the extendable arm is most extended.

The apparatus for sensing the home position is located at the lower portion of the homing and limit assemblies, and includes apparatus having indicating portions driven by the cable 34 via the pulley 86 and shaft 108 whose motion is thus synchronized to the movement of the corresponding cables driving the work holder. Only the homing assembly portion of the homing and limit assembly 88 will be described in detail, the homing assembly portion of homing and limit assembly 55 being substantially the same in operation and structure.

The homing assembly includes a notched homing disc 160 and an optical sensor 162 arranged so that the sensor detects the presence or absence of the notch. In this particular embodiment, the optical sensor 162 is a light-emitting diode and an interrupter type phototransistor mounted as one unit which is supported on a bracket 164 by screws 166. Bracket 164 is secured to the lower section of support assembly 116. The homing disc 160 is secured to the lower end of shaft 108, and rotates in union with pulley 86 which is coupled to the upper end of shaft 108 by means of pin 146, lever 144, adjusting screw 150 and bracket 148 affixed to pulley 86, with a helical spring 152 biasing the lever 144 against the head of the adjusting screw 150. Turning the adjusting screw 150 rotates homing disc 160 with respect to the cable 34 and the work piece so that easy and precise adjustment of the home position is possible.

In operation, an output signal from the optical sensor 162 determines the direction in which stepping motor 18 must be rotated to move edge 168 of homing disc 160 into alignment with the sensor. As soon as the edge reaches alignment, it causes a signal output change and the motor to stop. If the motor overshoots proper alignment, the motor can be reversed by the electrical control circuitry and the disc brought into more precise alignment with its aligned position. A similar apparatus is used for the other coordinate direction.

Referring now to FIG. 6, pivoting arm 52 is provided with free turning rollers 170, 172, attached to pivoting arm 52 by means of screws 174, and free turning rollers 176, 178 attached to levers 180, 182 respectively by means of screws 184. Levers 180, 182 are attached to pivoting arm 52 by screws 186 about which they can freely pivot. A compression spring 188 fits between levers 180, 182 and is held in place by lugs 190, 192 on levers 180, 182 respectively. This construction makes rollers 176, 178 movable and spring loaded. The extendable arm 70 rides on rollers 170, 172, 176, 178 as will be further described below.

Extendable arm 70 (FIG. 4) rides on tracks formed by triangular shaped portions 194, which allow the arm to ride on rollers 170, 172, 176, 178. Affixed on the underside of extendable arm 70 is a bracket 196 (FIGS. 4 & 5) to which a lower clamp jaw 198 of the work holder is attached by means of two screws 200. An upper clamp member 202 is pivotally mounted about its rear end around an axle 204. Upper clamp member 203 is urged downwardly about the axle by a compression spring 206 that fits around a stud portion 208 of the bracket 196. a thumbscrew 210 is used to adjust the spring force.

Assembled, the forward part of extendable arm 70, the part nearest the work holder, rides on rollers 170, 176 while the trailing part of the arm 70 rides on rollers 172, 178. The work holder, attached to the extenable arm 70, pivots with pivoting arm 52 around pivot pin 68 by means of an opening 212 in pivoting arm 52 through which pin 68 extends. As previously described, pivotal movement is controlled by cable 36, driven by stepping motor 20. Extendable arm 70 riding on the rollers 170, 172, 176, 178 in tracks 194 moves along the pivoting arm in a substantially radial direction with respect to pivot pin 68. As previously described, cable 34, driven by stepping motor 18, controls the radial movement of the extendable arm 70. Thus, depending on the direction of motor rotation, one end of the cable at stud 72 pulls while the other end of the cable at connecting point 94 relaxes, or vice versa. In this way, there is always a positive drive to control radial movement of the extendable arm.

Upper clamp 202, as noted above, is urged downward by spring 206. In this way, the work piece is clamped and held in position between upper and lower clamp jaws 220, 198. At the beginning of a sewing cycle when the work piece is placed in the work holder, and at the end of the sewing cycle when the work piece is removed from the work holder, the clamp 202 must be raised. Referring to FIG. 1, the apparatus for raising the upper clamp includes a solenoid actuated air valve 214 which, in response to a signal from the electrical circuitry at an appropriate time in a sequence of instructions, is energized and thereby admits air under pressure to a cylinder 216. In response, cylinder 216 pulls on cable 218 to lift clamp 202. At the beginning of a cycle, after the operation has placed the work piece in the work holder, the clamp will, in response to a manual or pedal switch, close as solenoid valve 214 is deenergized causing cylinder 216 to extend its piston by means of an internal spring (not shown) and relax the cable 218. Spring 206 thereby urges upper clamp 202 to pivot about axle 204 to forcibly engage the work piece between lower clamp jaw 198 and upper clamp jaw 220.

As a safety precaution, a clamp closed sensor 296 is provided to prevent automatic machine operation until the clamp has completely closed. Closure of the upper clamp is sensed by cable tension sensing assembly 222 (FIG. 1). When the clamp is fully closed, the cable relaxes and in response thereto a switch (not shown) in the assembly 222 resets by its own internal spring.

For proper operation of the apparatus, the movement of the work holder must be synchronized to the stitching cycle so that the work holder is moved only when the needle is not in the work piece. Furthermore, the sewing machine must stop at the end of a sewing cycle with the needle in the up position so that the work holder may be moved to the home position and so that the work piece may be removed from the work holder after the upper clamp is raised. Thread cutting is also done as part of this "needle-up" sequence. These functions are performed by a commercial apparatus, Quick, Model No. 800-ST-362 (not shown), which is modified somewhat for this particular application.

Figure 7:
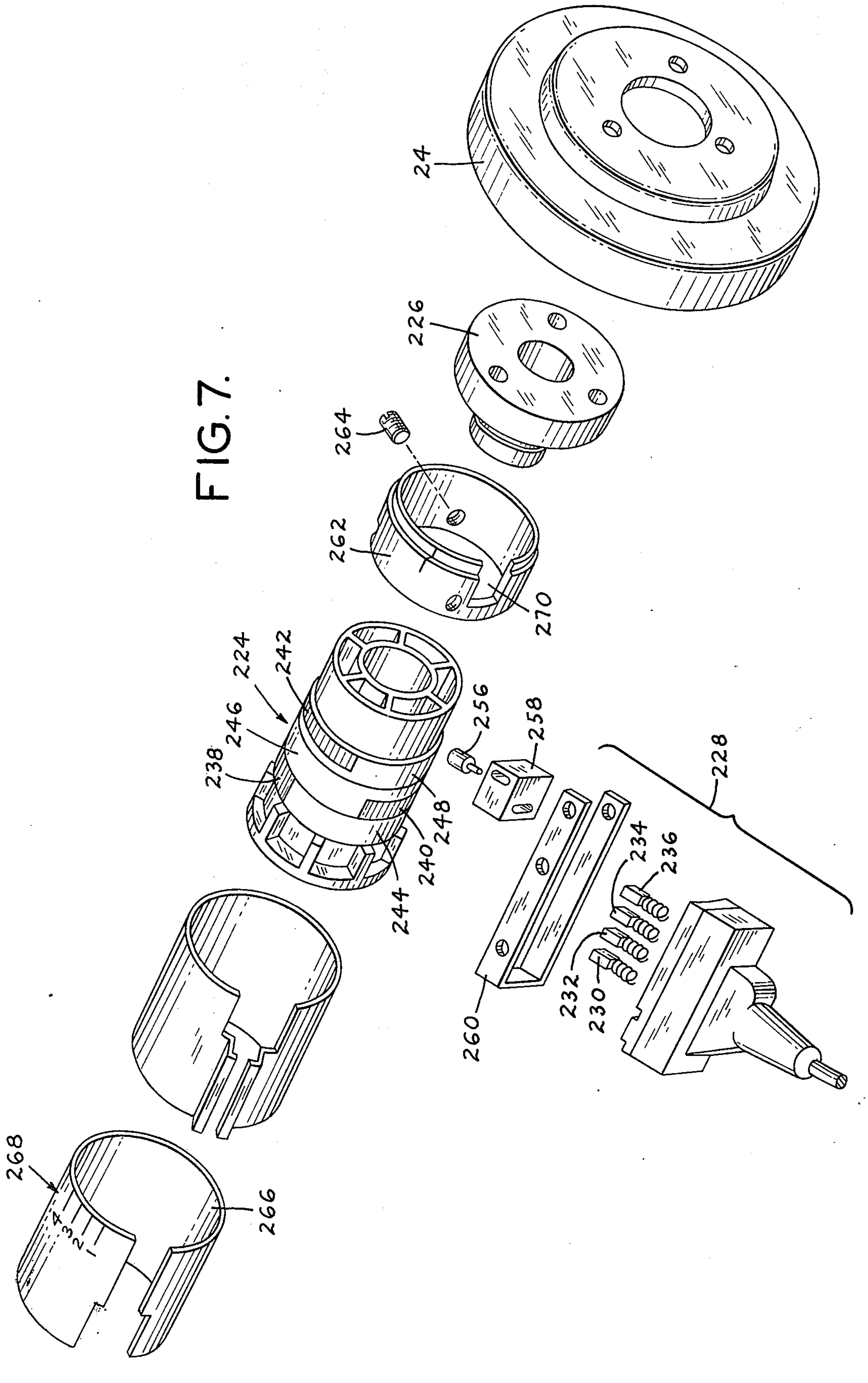
FIG. 7 is an exploded pictorial of the synchronizer unit.

Referring to FIG. 7, the electromechanical synchronization unit 22 includes a rotating slip ring assembly 224 which is affixed to the sewing machine hand wheel 24 by means of an adapter 226. A stationary portion 228 of assembly 224 includes electrical brushes 230, 232, 234, 236 affixed to a bracket (not shown). Insulating portions 238, 240 and 242 provide electrical interruptions in three slip rings 244, 246 and 248 when these portions are contacted by brushes 230, 232, 236 respectively. Brush 234 is used to supply electrical current to the slip rings. Current from the three active slip rings is used in a conventional manner to activate a commercial "needle positioner" (Quick, Model No. 800-ST-362 mentioned above). A pulley 252 and a belt 254 (FIG. 1) connect to a pulley (not shown) on the sewing machine needle positioner. By means of suitable gearing in the needle positioner and in response to electrical inputs from the electromechanical synchronization unit 22 and from the electrical control circuitry, the needle positioner will cause the sewing machine: (a) to run at fast speed or slow speed; (b) to actuate a solenoid powered thread cutter (not shown) and a thread tension release solenoid (not shown); and (c) to stop the machine with the needle up. This apparatus is all commercially available and it is mentioned here only for the purpose of adequately describing certain additions which follow.

The synchronizer 22 includes a photo-reflective transducer 256, its holder 258, a mounting strap 260, a photocell commutator ring 262, a set screw 264 retaining ring 262 at any chosen angular position on the assembly 224, a cover 266, and a scale 268 either imprinted on the cover or separately printed and affixed by adhesive. In operation, light emitted by transducer 256 strikes the surface of ring 262 and is reflected to an optical sensing portion of transducer 256 creating an output current. The output current remains constant except at a notched portion 270 of ring 262 at which the amount of reflected light and therefore the output current are greatly diminished. The notched portion and the corresponding signal change initiate the beginning of a time period in which the work holder can be moved without damaging the needle, that is, the beginning of the time period immediately after the needle has been withdrawn from the work piece. The needle positioner, although commercially designed for actuation by treadle, is made fully automatic by attaching an air cylinder (not shown) to its actuating lever. The air cylinder is controlled through an electric air valve (not shown) by current from the electrical control circuitry.

Figure 12:
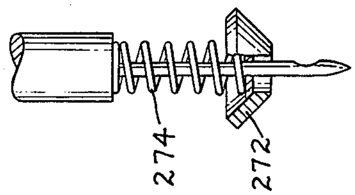
FIG. 12 is an enlarged view of the spring loaded stripper mounted on the needle bar.

Referring to FIG. 12, the presser foot of the sewing machine has been replaced by a spring loaded stripper mounted on a needle bar consisting of a stripper 272 and a compression spring 274. One end of the spring is affixed to the lower end of the needle bar and the other end is affixed to the top side of the stripper 272. The stripper holds the material down against the throat plate to allow a needle thread loop to form as the needle 14 begins to rise and to be picked up by the sewing machine's rotary hook (not shown).

As noted above, the addressable storage element which is preferred in this embodiment is a programmable read only memory (PROM). With the proper equipment, the operator of an automatic sewing machine according to this invention can change or add programs (i.e., instructions or a sequence of instructions) to a PROM. Depending on the information capacity of each storage location and the information content of each instruction, a single instruction may be stored in a single storage location. On the other hand, in the preferred embodiment of the invention, each instruction requires more than one storage location. The sequence of instructions stored describes a pattern which the automatic sewing machine work holder will follow. In this particular embodiment, the PROM has a randomly addressable eight binary digit (bit) word in each storage location and a total of 256 such locations.

Each instruction includes a command and work holder positioning data. In the preferred embodiment there are four commands. The first command directs movement of the work holder without stitching; the second directs movement of the work holder while stitching slowly; the third directs movement of the work holder while stitching at a fast rate; and the fourth indicates the end of the sequence of instructions and directs movement of the work holder to its home position. Each of the first three commands recited above requires two groups of positioning data to form a complete instruction. Each data group includes directional and stepping information necessary for a different one of the two coordinate directions to determine the next position of the work holder. While there are many possible ways of providing this information, it is preferred to construct each data group as a signed number which indicates the number of steps and the direction in which the work holder is to be moved. Thus, this particular embodiment of the invention utilizes an open loop system, that is, the work holder is moved from place to place during a sewing operation without any feedback to indicate its present position. In this particular embodiment, the maximum allowable number of steps in each coordinate direction is 12 per instruction when stitching at fast speed due to the time required to move the work holder while the needle is disengaged from the workpiece, and 15 per instruction when the work holder is moved without stitching.

In this embodiment, each instruction, when written in binary requires 12 bits. The designation of the command portion of each instruction requires two bits and the work holder positioning data requires five bits for each coordinate direction, one for the direction (positive or negative) and four bits to designate the number of steps. Thus, each instruction of the sequence requires more than one addressable location in the PROM.

Once the PROM has been programmed, that is, once the PROM contains a sequence of instructions in a predetermined order to describe a desired sewing pattern, the sewing machine is ready for operation. If the programs are short enough, two or more programs may be stored in a single storage element. In this case, switches, for example on the front panel of the sewing machine, may be manually operated to choose which of the programs is to be used.

Figure 8:
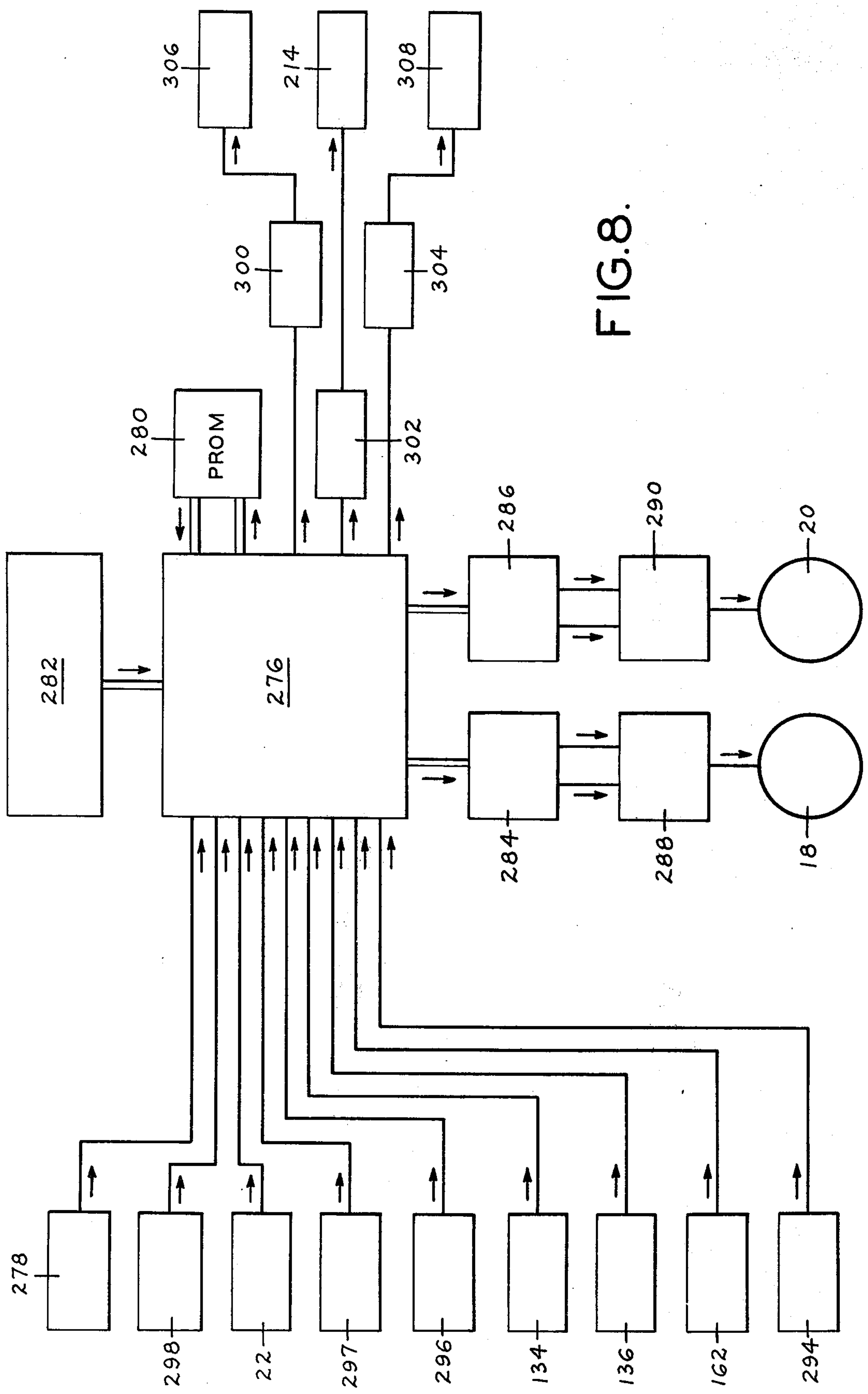
FIG. 8 is a block diagram of the electrical signal flow paths for the machine.

Referring to FIG. 8, the operation of the sewing machine is controlled by a central control logic 276. First the operator places a work piece in the proper position in the work holder 16. Then, when a foot pedal 278 of the sewing machine is depressed half way by the operator, a first switch (not shown) is closed causing the central control logic 276 by means not shown to generate a signal which causes soleonoid 214 to lower upper clamp 202 to engage and hold the work piece. After the clamp is lowered, the foot pedal is fully depressed by the operator and, if the clamp 202 is fully closed, automatic operation of the machine begins. In normal operation, a homing cycle is first initiated. Thereafter, the first instruction is read from the storage element 280, here shown as a PROM, according to the program selection switches (not shown) on the front panel 282 by the central control logic 276. This logic responds by providing the correct number of pulses for moving the work holder and, after a signal from electromechanical synchronization unit 22, transmits these pulses to motor drive logics 284 and 286. Drive logics 284, 286 drive respectively power drivers 288, 290 which in turn drive stepping motors 18, 20 in the desired direction and through the desired rotation.

The pulses to the drive logics 284, 286 are arranged to be aperiodic to increase the machine cycle rate and to prevent unwanted oscillations and therefore unwanted feeding of the work piece against the needle. The work piece thus moves in a true intermittent motion, the work piece being stationary when the needle is inserted into it. More particularly, the central control logic 276 includes means for spacing the first three pulses of a series of pulses and the last two pulses of the series further apart than any remaining intermediate pulses. Where the number of pulses to a stepping motor is less than three, the amount of current from the power drivers 288, 290 is reduced (by known means not shown) to further minimize oscillations in the stepping motors. The next instruction is then read and carried out, followed by the one after that, etc., until the last instruction has been implemented. In response to the last instruction which will be a stop command, the central control logic causes the needle positioner to halt the sewing machine, causes the thread to be cut, and then initiates a second homing cycle.

The homing cycle is controlled by the central control logic which, in response to the signals from optical sensors 162, 294, cycles the stepping motors to return the work holder to is radial and rotational home location.

Other inputs to the central logic are from the limit switch assemblies 134, 136, of both coordinate directions, clamp sensor 296 of clamp tension sensing assembly 222, and cutter circuitry 297. Cutter circuitry 297 signals the control logic after the thread has been cut. There is also included a needle/thread break sensor 298 which signals the control logic 276 of a break in the needle thread. Upon receipt of a break signal from a sensor 298, the control logic 276 causes a needle positioner to halt the sewing machine and inhibits any further movement of the work holder by stopping the incrementation of an address counter 372 (FIG. 13) which sequentially addresses the storage element. Thus, the address in address counter 372 is preserved and the control logic 276 waits for a restart signal from the front panel before starting up again. As will be explained hereafter, once the thread or needle has been repaired and replaced, the operator may restart the machine at the beginning of the sewing pattern or restart it at the instruction following the instruction at which the break occurred.

Depending upon whether an instruction requires slow or fast stitching, the control logic 276, in response to that instruction, will signal, through driver 300, a control box 306 of a Quick needle positioner (not shown) to cause the machine to stitch at the required speed. If a stop command is read, control logic 276, in response to that instruction, deactivates through driver 304, brake clutch valve solenoid 308 in the needle positioner to stop the sewing machine.

Figure 13:
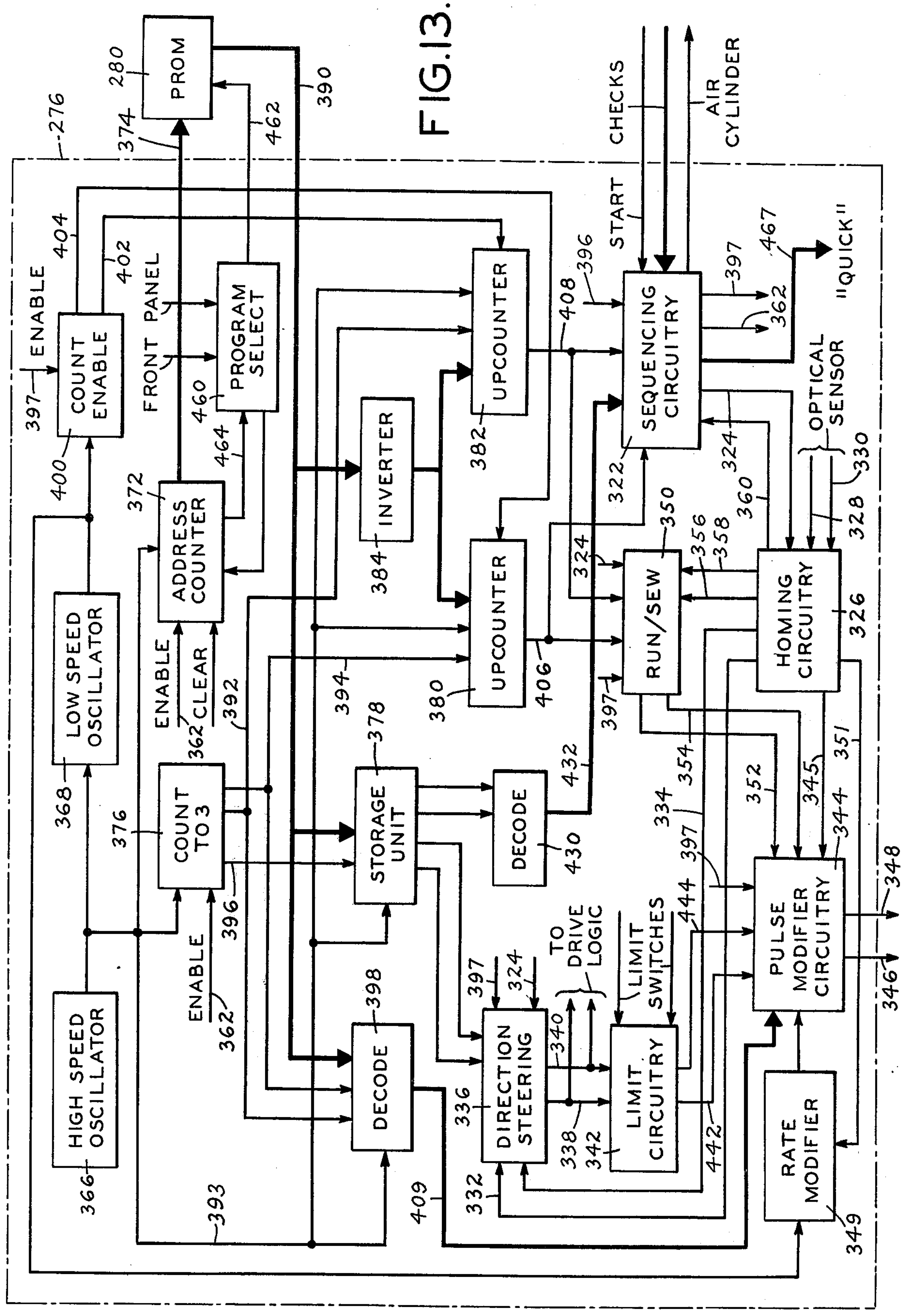
FIG. 13 is a block diagram of the central control logic.

Referring to FIG. 13, the control logic 276 (FIG. 8) is shown in greater detail. A sequencing circuitry 322 monitors over the cable labelled "CHECKS": (a) inputs from synchronization unit 22; (b) clamp sensor 296; (c) needle/thread break sensor 298; (d) cutter circuitry 297; (e) limit switch assemblies 134, 136; (f) front panel 282; and (g) optical sensors 162, 294 for both coordinate directions. Signals from foot treadle 278 are read over the line labeled "START". Gating logic circuits provided within the sequencing circuitry serve to halt machine and work holder operation if the proper operating conditions are not maintained. When the operator fully depresses the treadle, this causes an enabling signal on line 324 to appear and initiate the first homing cycle when the clamp sensor indicates the work holder is closed. This homing insures that the work holder will be at a predetermined initial position at the beginning of a sewing sequence.

Homing circuitry 326 operates together with homing and limit assemblies 55, 88 to present the work holder at the desired locations for sewing in each of the two coordinate directions. For convenience, the coordinate directions will be called X and Y, corresponding to a rectilinear coordinate system, although in the preferred embodiment the coordinate system is based on polar coordinates modified to approximate a rectilinear system. The homing circuitry, in response to the enabling signal over line 324 from the sequencing circuitry 322, provides output signals over lines 332 and 334 to a direction steering circuitry 336, based upon the inputs from optical sensors 162, 294 over lines 328, 330. These output signals indicate the direction in which the stepping motors should be moved. Direction steering circuitry 336 gates the signals on lines 332, 334 to the motor drive logics 284, 286 to control the direction of movement of the motors 18, 20. These signals are also gated to a limit circuitry 342 over lines 338 and 340 whose operation will be described below. The homing circuitry 326 also enables a pulse modifier circuitry 344 by a signal over line 345 so it is in condition to be enabled to provide output electrical pulses over lines 346 and 348 from the low speed oscillator 368. After the first homing approach, this output is preferably reduced in frequency by a rate modifier circuitry 349 to motor drive logics 284, 286, as will be explained hereinafter, by the signals over a command line 351 from homing circuitry 326.

Pulse modifier circuitry 344 is enabled to gate these pulses to the motor drive logic by signals from a run/sew circuitry 350 over lines 352 and 354. Signals on one of these lines control the gating of pulses to one of the motors 18, 20 while signals on the others control the gating of pulses to the other motor. The signals on lines 352, 354 are provided by the run/sew circuitry 350 in the homing mode by a set of input signals over lines 356 and 358 from homing circuitry 326 when there exists an enabling signal over line 324 from the sequencing circuitry 322. The absence of signals over one of lines 356, 358 and thus one of lines 352, 354 causes the pulse modifier circuitry to inhibit pulsing to the corresponding stepping motor. This occurs whenever the home position for the corresponding coordinate direction has been achieved. For proper operation of the pulse modifier circuitry during the homing cycle, there must be enabling signals over line 345 and one or both of lines 352, 354.

In all cases, the stepping motors overshoot the home position. When this occurs the optical sensors generate a signal which causes the motor involved to reverse and "zero in" on the correct home position. This is done by changing the signals over lines 332 and/or 334 according to information from the optical sensors to reverse the direction of one or both stepping motors. The homing circuitry also includes additional logic circuitry for ensuring that the final approach of each motor to its home position is always from the same direction irrespective of the initial position of the work holder prior to homing. In addition, all homing motion after the first home approach is accomplished at a reduced rate generated by rate modifier circuitry 349. Means in the homing circuitry 326, responsive to the optical sensor outputs, provide the signal over command line 351 for causing the stepping rate to be reduced. This mixture of stepping rates creates an optimally fast homing cycle.

In this particular embodiment there is always at least one change of direction of approach to the home position for each motor. If, after reversing the motor, the second approach direction is not the same as an approach direction predetermined in advance, the direction of motor rotation is automatically reversed again by logic in the homing circuitry which senses the direction of approach and a third and final approach is made from the predetermined approach direction. In this way, greater accuracy in positioning the work holder is achieved.

When the first homing cycle has been completed a signal is placed by the homing circuitry on line 360 from the homing circuitry 326 to the sequencing circuitry 322. In response to this signal, the enable level on line 324 is immediately removed by the sequencing circuitry thereby preventing further movement of the work holder. The sequencing circuitry then initiates a memory cycle by generating an enable signal level over a line 362. This signal level allows words from storage element 280 to be addressed and read as follows. The output of a high speed oscillator 366 is reduced by a counter here labeled low speed oscillator 368 whose output is one-tenth the frequency of the high speed oscillator. The low speed oscillator 368 provides periodic pulses which determine the rate at which the stepping motors will be driven. The enable signal on line 362 enables the address counter 372 whose output on lines 374 represents the address of the word which is going to be read from the storage element. The enable signal on line 362 also enables a count to three counter 376 whose outputs determine which of three units portions of a word of storage are read into. The three units comprise a storage unit 378 which receives the command portion of the instruction and the signs of the coordinate directions, upcounter 380 and upcounter 382. These two upcounters respectively receive the work holder positioning data for each coordinate direction in inverted form after it is inverted by an inverter 384 comprising several inverting gates.

In operation, the first clock pulse output of the high speed oscillator 366, after line 362 is enabled increments address counter 372 resulting in a new four bit word being available from the storage element over lines 390. The same clock pulse also increments the count to three counter which causes an enabling signal to appear on one of its output lines, namely line 392 corresponding to a count of one. This in turn enables the upcounter 382 to store the four bit word in inverted form. The inverted four bit word is entered into the upcounter 382 by the trailing edge of the same first clock pulse over line 393.

In the same fashion, the next clock pulse from the high speed oscillator (corresponding to a count of two) increments counters 372 and 376 and causes the inverse of the next addressed four bit word to be read into upcounter 380 as determined by an enabling signal from count to three counter over line 394. This corresponds to a count of two.

The third clock pulse from the high speed oscillator again increments counters 372 and 376 and causes the next addressed four bit word to be read into storage unit 378 as determined by an enabling signal from the count to three counter over line 396. This corresponds to a count of three. The enabling signal on line 396 is also provided by a connection, not shown, to the sequencing circuitry 322 in response to which the enabling signal on line 362 is removed. As a result, the count to three counter 376 is reset to zero, and address counter 372 cannot be incremented. By this time, one complete instruction has been read from the memory and is stored, parts in each of upcounters 380, 382 and storage unit 378.

All that remains to utilize this instruction is to translate it into movement of the stepping motors 18, 20 and into motion of the sewing machine, if required. Where the previous instruction required a sewing operation, this is accomplished by a signal from the synchronizing unit 22 which is connected to the sequencing circuitry over one of the lines entitled CHECKS and which causes the sequencing circuitry to provide an enabling signal over line 397 indicating that the needle is clear of the work piece. Where the previous instruction did not require stitching, for example when the work holder is positioned for sewing following the first homing operation, the equivalent of the needle disengage signal is generated internally by logic means within the sequencing circuitry to produce an enabling signal over line 397 a short time after the new instruction is read into storage. In either instance, the enabling signal over line 397 is connected to the pulse modifier circuitry 344 which allows the stepping motors to be driven in accordance with the outputs of upcounters 380, 382 whenever appropriate signals are present on lines 352, 354, 442, 444. The latter two lines (from limit circuitry 342) will always have appropriate signals on them for this purpose unless the worker holder is outside of its permitted range of movement.

After the enabling signal is provided on line 397, clock signals from the low speed oscillator increment upcounters 380, 382 through a count enable circuitry 400 over lines 402, 404. At the same time, the same clock signals from the low speed oscillator are connected to pulse modifier circuitry 344. Pulse trains from the pulse modifier circuitry to drive each stepping motor are derived from these low speed clock signals for each coordinate direction.

The outputs of upcounters 380, 382 determine the number of outpt pulses there will be to step each motor in a given coordinate direction. The directions are determined by the direction indicating portions of the word stored in storage unit 378. The direction indicating portions are gated to the stepping motor drive logic and the limit circuitry by direction steering logic 336. The number of output pulses to each motor corresponds to the data, the inverse of which was intitially stored in the upcounters. The upcounters are constructed so that, when they have been incremented a number of times equal to the number of steps specified in the instruction, a carry output appears on lines 406, 408. The carry outputs are sent to the run/sew circuitry and affect the pulse modifier circuitry 344 by run/sew circuitry 350 response over lines 352, 354. As noted above, signals over one or the other of lines 352, 354 indicate that a proper number of input pulses from the low speed oscillator have been received for a particular coordinate direction. When both carry outputs appear (and, of course, they need not appear in the same clock cycle) the sequencing circuitry 322 causes the enable signal on line 397 to be removed thereby indicating that the information contained in the instruction last read from the memory has been utilized.

As long as the work holder is within the limits that are mechanically set in the limit portion of the homing and limit assemblies, the pulse modifier circuitry operates as follows. During the homing cycle when there is the enabling signal on line 345, pulses from the low speed oscillator are applied to the stepping motors in the coordinate direction or directions indicated by the signals on lines 332, 334. The output pulse trains are periodic. During that portion of the logic operation when there is an enabling signal on line 397 due to a single instruction being utilized, the periodic pulses from the low speed oscillator 368 are gated according to the data stored in the upcounters 380, 382 to provide pulse trains to the stepping motor drive logics over lines 346, 348. If the number of steps in a coordinate direction is at least three, the pulse train for that direction is derived as follows.

After the enable signal on line 397 appears, the first clock signal from the low speed oscillator is passed through the pulse modifier circuitry to the drive logic. The second and third clock signals from the low speed oscillator are blocked and an initial delayed pulse is added by the pulse modifier circuitry approximately equidistant between what would originally have been the second and third clock signals. The clock signals from the low speed oscillator after the third clock signal pass through circuitry 344 essentially unchanged as long as there is no change in signal level over whichever one of lines 352 or 354 corresponds to the coordinate direction concerned. After a change in signal level on one of lines 352, 354 further clock signals from the low speed oscillator are blocked from forming part of the output pulse train for that coordinate direction. Thereafter an additional terminal delayed pulse is automatically added by the pulse modifier to the otherwise terminated output pulse train. This pulse is added a predetermined interval of time following the last pulse in the train, the time interval being greater than the time between pulses from the low speed oscillator. As a result, the drive pulses to the stepping motors are aperiodic, having a somewhat lower frequency at both the beginning and end of the pulse train and a higher frequency in the middle of the pulse train. This allows an increased machine cycle rate with smaller oscillations and therefore more accurate positioning.

When the information from storage element 280 was entered into upcounters 380 and 382, if the number of steps specified for either coordinate direction was one or two, this information was stored in decode circuitry 398 and is immediately made available to the pulse modifier circuitry over lines 409. The pulse modifier circuitry in response to this information from decode circuitry 398 alters its normal operation, described above, so that, if only two stepping pulses are required, only the initial delayed pulse is added and if only one pulse is required neither the initial nor the terminal delayed pulses are added.

When the called for number of X and Y steps has been obtained, as indicated by a change in the carry signals from the upcounters, the enable signal 397 is removed and the sequencing circuitry, after a short delay starts a new memory cycle and provides an enable signal over line 362 to read the next instruction from memory. The operation of control circuitry 276 then repeats until an end of program signal is encountered.

The limit circuitry 342 discussed briefly above operates so that, if the limit switches indicate that the work holder has reached a boundary, a signal from limit circuitry 342 to pulse modifier circuitry 344 over one of lines 442, 444, depending upon the coordinate direction involved, acts to inhibit further drive pulses to the corresponding stepping motor until the direction of stepping has been reversed, as indicated by the signals over lines 338 or 340 from direction steering circuitry 336. The only effect this has on the operation of the sewing machine or the electrical control circuitry is to halt movement of the work holder in the coordinate direction concerned. The central control logic and the sewing machine continue to operate normally except for inhibiting drive pulses to the stepping motor concerned.

Storage unit 378 stores a command and direction information as described above. Each bit of the command is connected to decode circuitry 430. Each output line of decode circuitry 430 collectively labeled 432 is associated with a particular command. The decode circuitry decodes the command stored in unit 378 and provides an enabling signal level on the one of its output lines 432 associated with that command. Output lines 432 are connected to the sequencing circuitry 322 where they are amplified before being sent on to the Quick unit 306 over line 467 to control the operation of the sewing machine.

The sequencing circuitry utilizes the signals over lines 432 for two purposes. First to differentiate between stitch and no stitch commands to effect proper operation of the needle positioner and second, in response to a "stop" command, to provide end of program sequencing which includes signalling cutter circuitry 297 to cut the thread and return the work holder to its home position. To accomplish the latter operation, an enabling signal on a line 324 is generated in response to an "end of cut" signal from the cutter circuitry 297 in the presence of an "end of program" signal or command over one of the lines 432. After this second homing cycle is completed, the upper clamp is raised in response to a signal from central control logic 276 to a solenoid actuated air valve 214 through driver 302 so that the work piece can be removed.

The Quick unit 306 utilizes the signals over lines 467 from the sequencing circuitry 322 to stitch fast or slow and to initiate a needle up and trim in response to the stop command.

In the particular embodiment shown in FIG. 13, storage element 280 is a PROM. In many circumstances the program describing a pattern will not occupy all of the memory and in fact may not occupy even half of the memory. As a result, the PROM is split into two portions, an odd and an even portion and switches on the front panel determine whether the PROM is used in its split mode (odd or even) or in a full complement mode. In the preferred embodiment, each location in the PROM contains eight bits as mentioned above. These bits may be numbered for convenience 1, 2, 3, . . . , 8. The odd half of the memory is defined here as the bits of each word numbered 1, 3, 5, 7, and the even half is defined as the bits numbered 2, 4, 6, 8. In other embodiments of the invention there will be other acceptable divisions of the memory. Program select circuitry 460 in response to the front panel switches has an output over line 462 which indicates to the PROM whether to choose the program stored in the odd or even storage locations. When a program occupies the entire PROM, it is written in the PROM so that, by sequencing first through the instructions as if it were an "even" program and then through the instructions as though it were an "odd" program, the entire program is read. In this case, a carry signal from address counter 372 over line 464 tells the program select circuitry when to switch from even to odd.

Other embodiments will occur to those skilled in the art and are within the following claims:

What we claim is:

1. An automatic sewing machine comprising
- a sewing needle,
- a work holder for holding a work piece during sewing,
- a nondestructive, nonvolatile storage element having a plurality of randomly addressable storage locations, said storage locations containing instructions for positioning the work holder and needle relative to one another in a plurality of positions,
- electrical means for reading these instructions in a predetermined sequence, the electrical means having output signals representative of said sequentially read instructions, and
- means responsive to said output signals for intermittently positioning the work holder relative to the needle at predetermined times to produce a predetermined pattern of movement and stitching without damaging the needle.

2. The sewing machine of claim 1 wherein said electrical means includes means for sequentially reading a single instruction from at least two of said storage locations.

3. The sewing machine of claim 1 wherein the storage element comprises a semiconductor memory.

4. The sewing machine of claim 3 wherein the storage element comprises a memory in which the stored instructions may be changed to describe a new pattern of movement and stitching.

5. The sewing machine of claim 3 wherein the storage element comprises a memory in which the stored instructions may not be changed to describe a new pattern of movement and stitching.

6. The sewing machine of claim 1 wherein
the responsive means includes a stepping motor, and
the electrical means includes means for providing a first series of aperiodic electrical pulses to said motor, said pulses being representative of the number of steps said motor should move according to one of said instructions and said motor being responsive to said aperiodic pulses for causing relative movement between the work holder and sewing machine needle.

7. The sewing machine of claim 6 wherein the electrical means includes means for producing a second series of aperiodic pulses for moving a second stepping motor according to said one of said instructions.

8. The sewing machine according to claim 1 wherein there is an actuatable homing device and the electrical means includes electric circuitry responsive to said homing device for automatically positioning the work holder at a predetermined home position relative to the needle and for insuring that the final movement of the work holder into its home position always takes place in the same predetermined direction.

9. The sewing machine according to claim 8 further including means for controlling the speed at which the work holder is positioned on the final approach to be less than the speed at which the work holder is positioned on a first approach.

10. The sewing machine of claim 8 wherein said electrical means further includes means for actuating the homing device before producing said output signals and for actuating the homing device after producing said output signals.

11. The sewing machine of claim 1 including a check device for providing an interrupt signal in response to the existence of an improper operating condition,
said electrical means including circuitry for halting both the sequential reading of instructions and movement of the sewing needle in response to such interrupt signal and a restart switch for thereafter beginning said sequential reading of instruction at one of two predetermined addresses of the storage element.

12. The sewing machine of claim 11 including
an actuatable homing device, and
said electrical means including circuitry for actuating said homing device in response to an actuation of said restart switch when said sequential reading begins at the beginning of said predetermined sequence.

13. The sewing machine of claim 11 wherein the check device includes a thread-break detector for providing said interrupt signal to the electrical circuitry when an undesirable change in the tension of the sewing thread is detected.

14. The sewing machine of claim 1 wherein the electrical means includes limit circuitry responsive to the position of the work holder for inhibiting passage of the output signals to the positioning means without interfering with other operations of the electrical circuitry whereby the work holder will not be positioned beyond a predetermined range of movement.

15. An actuatable closed loop homing means for use in an automatic sewing machine having a sewing needle, a work holder for holding a work piece during sewing, a storage element containing instructions for positioning the work holder relative to the needle in a plurality of positions to produce a predetermined pattern of movement and stitching and means responsive to said instructions for positioning the work holder relative to the needle for producing said predetermined pattern and stitching, said closed loop homing means comprising a position indicating device for reporting the position of the work holder relative to a predetermined home position at selected times, and electric circuitry responsive to the position indicating device for automatically positioning the work holder at said predetermined home position, said circuitry including additional means responsive to the position of said work holder for insuring that the final movement of the work holder into its home position always takes place in the same direction after an initial approach to the home position.

16. An actuatable closed loop homing means according to claim 15 wherein said electric circuitry includes means for providing periodic electric pulse signals for moving the work holder toward and into said home position.

17. An automatic sewing machine comprising
a sewing needle,
a work holder for moving a work piece in a plane during sewing,
a nondestructive, nonvolatile semiconductor storage element having a plurality of randomly addressable storage locations, said storage locations containing instructions for positioning the work holder in a plurality of positions relative to an axis of the sewing needle,
electrical means for addressing the storage locations in said element in a predetermined sequence and for reading instructions from said storage element in said predetermined sequence,
the electrical means further including first and second upcounters for storing data group portions of each instruction and a fixed storage element for storing directional and command portions of each instruction,
the electrical means having output signals representative of said sequentially read instructions, and
means responsive to said output signals for intermittently positioning the work holder relative to the needle at predetermined times to produce a predetermined pattern of movement and stitching without damaging the needle.

18. The sewing machine of claim 17 wherein said electrical means further includes sequencing circuitry for providing a homing cycle prior to reading instructions from the randomly addressable storage element and for providing a homing cycle after the last instruction in said predetermined sequence has been read and utilized.

19. The sewing machine of claim 18 further including a check device for providing an interrupt signal in response to the existence of an improper operating condition, and
said electrical means further including circuitry for halting both the sequential reading of instructions and movement of the sewing needle in response to such interrupt signal and a restart switch for thereafter initiating said sequential reading of instructions at one or two predetermined addresses of the randomly addressable storage element.

20. An automatic sewing machine, comprising:

a sewing needle;

a work holder for holding a work piece during sewing;

a nondestructive, nonvolatile memory unit having a plurality of randomly addressable information words, said words including commands for directing sewing of the work piece;

a control system for sequentially reading said words and generating output signals representing said commands; and means responsive to said output signals for directing movement of at least said work holder or needle to produce a sewing sequence relative said work piece.

21. The sewing machine of claim 20 wherein at least one of said commands directs movement of the work holder, and the directing means includes means responsive to the output signals representing said movement command for moving the work holder relative the needle.

22. The sewing machine of claim 21 wherein said movement command directs movement of the work holder during reciprocation of the needle, and in which the moving means moves the work holder relative the needle during reciprocation of the needle.

23. The sewing machine of claim 22 wherein said movement command directs reciprocation of the needle at a relatively fast speed, and the directing means includes means responsive to the output signals representing said fast movement command for reciprocating the needle at said relatively fast speed.

24. The sewing machine of claim 22 wherein said movement command directs reciprocation of the needle at a relatively slow speed, and the directing means includes means responsive to the output signals representing said slow movement command for reciprocating the needle at said relatively slow speed.

25. The sewing machine of claim 21 wherein said movement command directs movement of the work holder without reciprocation of the needle, and the directing means includes means responsive to the output signals representing said command for positioning the needle at a stationary location spaced from the work piece.

26. The sewing machine of claim 20 wherein at least one of said commands directs cessation of the sewing sequence, and the directing means includes means responsive to the output signals representing said cessation command for stopping reciprocation of said needle at a location spaced from the work piece.

27. The sewing machine of claim 26 including means for positioning the work holder at a predetermined home position relative the needle subsequent to stopping reciprocation of the needle.

28. The sewing machine of claim 26 including means responsive to the stopping means for cutting a thread used to stitch the work piece.

29. The sewing machine of claim 27 including means responsive to the stopping means for cutting a thread used to stitch the work piece, means for determining when said thread has been cut by the cutting means, and including means responsive to the determining means for initiating the positioning means.

30. The sewing machine of claim 20 wherein the work holder comprises clamp means movable between open and closed positions.

31. The sewing machine of claim 30 including actuable switch means, and means responsive to actuation of said switch means for closing the clamp means and holding the work piece.

32. The sewing machine of claim 31 including pedal means for actuating said switch means.

33. The sewing machine of claim 31 including means for determining when said clamp means is closed, and including means responsive to the determining means for initiating a sewing sequence.

34. The sewing machine of claim 33 including second actuable switch means, and in which the initiating means only initiates the sewing sequence when the second switch means is actuated.

35. The sewing machine of claim 33 including means responsive to the initiating means for positioning the work holder at a predetermined home position relative the needle.

36. The sewing machine of claim 30 including means for opening the clamp means subsequent to completion of the sewing sequence.

37. The sewing machine of claim 27 including means for opening the clamp means subsequent to completion of the sewing sequence, and means responsive to completion of the positioning means for initiating the opening means.

38. The sewing machine of claim 20 including means for determining breakage of a thread used in stitching the work piece.

39. The sewing machine of claim 38 including means responsive to the determining means for interrupting said sequence of the control system.

40. The sewing machine of claim 39 including means for indicating when the broken thread has been repaired.

41. The sewing machine of claim 40 including means responsive to the indicating means for continuing the interrupted sequence of said control system.

42. The sewing machine of claim 40 wherein the reading sequence of said control system begins at a predetermined storage location in the memory unit, and including means responsive to the indicating means for initiating said sequence at said predetermined storage location.

43. A method of sewing a work piece with an automatic sewing machine comprising the machine-performed steps of:

sequentially reading a plurality of instructions from a nondestructive, nonvolatile randomly addressable storage unit having a plurality of randomly accessible instructions;

sequentially generating electrical signals representative of each of said read instructions; and sequentially moving a work holder retaining the work piece relative a needle in said machine responsive to said signals to produce a sewing sequence relative the work piece.

44. The method of claim 43 including the step before said reading step of closing a clamp member against said work piece.

45. The method of claim 44 including the step of verifying said clamp member is closed before said reading step.

46. The method of claim 43 including the step of positioning the work holder at a predetermined home position relative said needle.

47. The method of claim 46 wherein said positioning step is prior to said reading step.

48. The method of claim 46 wherein said positioning step is subsequent to the sequence of said reading, generating and moving steps.

49. The method of claim 46 wherein said positioning step includes the steps of approaching the needle with the work holder along an initial direction, and approaching the needle with the work holder along a final predetermined direction.

50. The method of claim 49 wherein the initial approaching step moves the work holder at a first speed, and the final approaching step moves the work holder at a second slower speed.

51. The method of claim 43 including the step of limiting movement of the work holder toward said needle to prevent contact of the work holder against the needle.

52. The method of claim 43 including the step of reciprocating the needle while moving the work holder and retained work piece.

53. The method of claim 43 including the step of moving the work holder and retained work piece without reciprocating the needle.

54. The method of claim 43 wherein the moving step moves the work holder at a first fast speed relative the needle responsive to certain of said instructions and representative signals, and moves the work holder at a second slower speed responsive to other of said instructions and representative signals.

55. The method of claim 43 including the step of initiating said reading step at separate storage locations in said memory unit.

56. The method of claim 43 including the step of determining whether a thread used in stitching the work piece has broken.

57. The method of claim 56 including the step of interrupting the sequence of said reading, generating, and moving steps when said thread is broken.

58. The method of claim 57 including the step of continuing the interrupted sequence of said reading, generating and moving steps when said thread has been repaired.

59. The method of claim 57 including the step of initiating said reading step at a predetermined storage location when said thread has been repaired.

60. The method of claim 43 including the step of stopping said reading, generating and moving steps responsive to one of said instructions.

61. The method of claim 60 including the step of cutting a thread used in stitching of the work piece after said stopping step.

62. The method of claim 61 including the step of verifying that said thread is cut.

63. The method of claim 48 including the step of verifying that said thread is cut, and wherein said positioning step is subsequent to said verifying step.

64. The method of claim 60 including the step of releasing a clamp member retaining the work piece from the work piece after said stopping step.

65. An automatic sewing machine, comprising:

a sewing needle;

a work holder for retaining a work piece during sewing and being capable of simultaneous movement along generally orthogonal coordinate directions;

means for moving the work holder relative the needle, the moving means being capable of simultaneously moving the work holder along both coordinate directions;

nondestructive, nonvolatile memory means having a plurality of randomly addressable storage locations, said storage locations including data words containing positional and directional information associated with the work holder; and means responsive to the selected data words for generating signals for the moving means and for controlling the direction of movement and position of the work holder relative the needle along both said coordinate directions.

66. The sewing machine of claim 65 including address means for sequentially selecting said data words.

67. An automatic sewing machine having a timing cycle of a predetermined duration between successive stitches, comprising:

a sewing needle;

a work holder for retaining the work piece during sewing;

means for driving the work holder relative the needle;

nondestructive, nonvolatile memory means having a plurality of randomly addressable storage locations;

means for sequentially addressing a plurality of said storage locations during each timing cycle of the machine; and means for sequentially reading information in the addressed storage locations and generating signals representing said information for controlling the driving means.

68. An automatic sewing machine, comprising:

a sewing needle;

a work holder for retaining a work piece during sewing;

a nondestructive, nonvolatile memory means having a plurality of randomly addressable storage locations, said storage locations including data words indicating a plurality of desired operational modes for said needle and work piece;

address means for selecting said storage locations including said mode words; and means responsive to a selected mode data word for controlling the operational mode of said needle and work piece.

69. The sewing machine of claim 1 including address means for sequentially selecting said storage locations.

70. The sewing machine of claim 20 including address means for sequentially selecting said information words.

71. The method of claim 43 including the step of sequentially addressing said instructions.

* * * * *